United States Patent
Kubota et al.

(10) Patent No.: US 12,395,107 B2
(45) Date of Patent: Aug. 19, 2025

(54) ELECTRIC MOTOR

(71) Applicant: KABUSHIKI KAISHA TOYOTA JIDOSHOKKI, Aichi-ken (JP)

(72) Inventors: Masashi Kubota, Kariya (JP); Takuya Naruse, Kariya (JP); Takashi Kawashima, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 163 days.

(21) Appl. No.: 18/504,262

(22) Filed: Nov. 8, 2023

(65) Prior Publication Data

US 2024/0171102 A1    May 23, 2024

(30) Foreign Application Priority Data

Nov. 15, 2022   (JP) .................. 2022-182583

(51) Int. Cl.
H02P 21/18      (2016.01)
(52) U.S. Cl.
CPC .................... H02P 21/18 (2016.02)
(58) Field of Classification Search
CPC ........................................ H02P 21/18
USPC ................. 318/400.02, 400.01, 700
See application file for complete search history.

(56) References Cited

U.S. PATENT DOCUMENTS 7,812,557 B2 *  10/2010  Maekawa ............. D06F 37/304
                                                  388/906

FOREIGN PATENT DOCUMENTS

JP        2011-172324         9/2011

* cited by examiner

Primary Examiner — David Luo
(74) Attorney, Agent, or Firm — GREENBLUM & BERNSTEIN, P.L.C.

(57) ABSTRACT

An electric motor includes processing circuitry. The processing circuitry estimates the position of a rotor in a mode selected from an induced voltage mode and a harmonic superimposition mode. The induced voltage mode is a mode of estimating the position of the rotor based on an induced voltage that is generated in three-phase coils. The harmonic superimposition mode is a mode of estimating the position of the rotor by superimposing a harmonic on a command value. The processing circuitry estimates the position of the rotor using the induced voltage mode when the output voltage is greater than or equal to a predetermined threshold value and estimates the position of the rotor using the harmonic superimposition mode when the output voltage is less than the threshold value.

3 Claims, 3 Drawing Sheets

ELECTRIC MOTOR

BACKGROUND

1. Field

The present disclosure relates to an electric motor.

2. Description of Related Art

When a motor unit is driven through sensorless control of an inverter unit, a controller needs to estimate the position of a rotor of the motor unit. Sensorless control is a control mode of estimating the position of a rotor using software to drive the motor unit without using a hardware position sensor. The mode of estimating the position of a rotor is, for example, an induced voltage mode or a harmonic superimposition mode. The induced voltage mode uses an induced voltage generated by driving of the motor unit to estimate the position of the rotor. The harmonic superimposition mode estimates the position of the rotor by superimposing a harmonic component on a voltage command value or a current command value for the motor unit.

As the speed of the motor unit decreases, the induced voltage decreases. Thus, in the case of using the induced voltage mode, the accuracy of estimating the position of the rotor is reduced when the speed of the motor unit is relatively low. Japanese Laid-Open Patent Publication No. 2011-172324 discloses a controller that estimates the position of a rotor using the harmonic superimposition mode when the speed of the motor unit is lower than a threshold value. This limits situations in which the accuracy of position estimation is reduced when the speed of the motor unit is lower than the threshold value.

The controller disclosed in the above publication switches the mode of estimating the position of the rotor depending on the speed of the motor unit. However, the induced voltage also changes depending on the temperature of the motor and the tolerance of magnets included in the motor unit. Thus, the threshold value needs to be set to be relatively large by taking into account variations in the induced voltage that would result from these factors. This increases a speed range in which the position of the rotor is estimated using the harmonic superimposition mode. When the position of the rotor is estimated using the harmonic superimposition mode, the quietness of the motor unit may be lowered by superimposing a harmonic on the voltage command value or the current command value. Further, the generation of a harmonic current may lower the efficiency of the motor unit. Thus, it is preferred that the speed range in which the position of the rotor is estimated using the harmonic superimposition mode be as narrow as possible.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

An electric motor according to an aspect of the present disclosure includes a motor unit including a rotor, a stator, and three-phase coils wound around the stator, an inverter unit including a driver and a switching element driven by the driver, the inverter unit being configured to drive the motor unit when the switching element is driven, an output voltage detector configured to detect an output voltage of the inverter unit, and processing circuitry configured to calculate command values and control the switching element, the command values being used to control the switching element. The processing circuitry is configured to estimate the position of the rotor in a mode selected from an induced voltage mode and a harmonic superimposition mode. The induced voltage mode is a mode of estimating the position of the rotor based on an induced voltage that is generated in the three-phase coils. The harmonic superimposition mode is a mode of estimating the position of the rotor by superimposing a harmonic on each of the command values. The processing circuitry is configured to estimate the position of the rotor using the induced voltage mode when the output voltage is greater than or equal to a predetermined threshold value and estimate the position of the rotor using the harmonic superimposition mode when the output voltage is less than the threshold value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, apparatuses, and/or systems described. Modifications and equivalents of the modes, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electric motor according to an embodiment will now be described.

Figure 1:
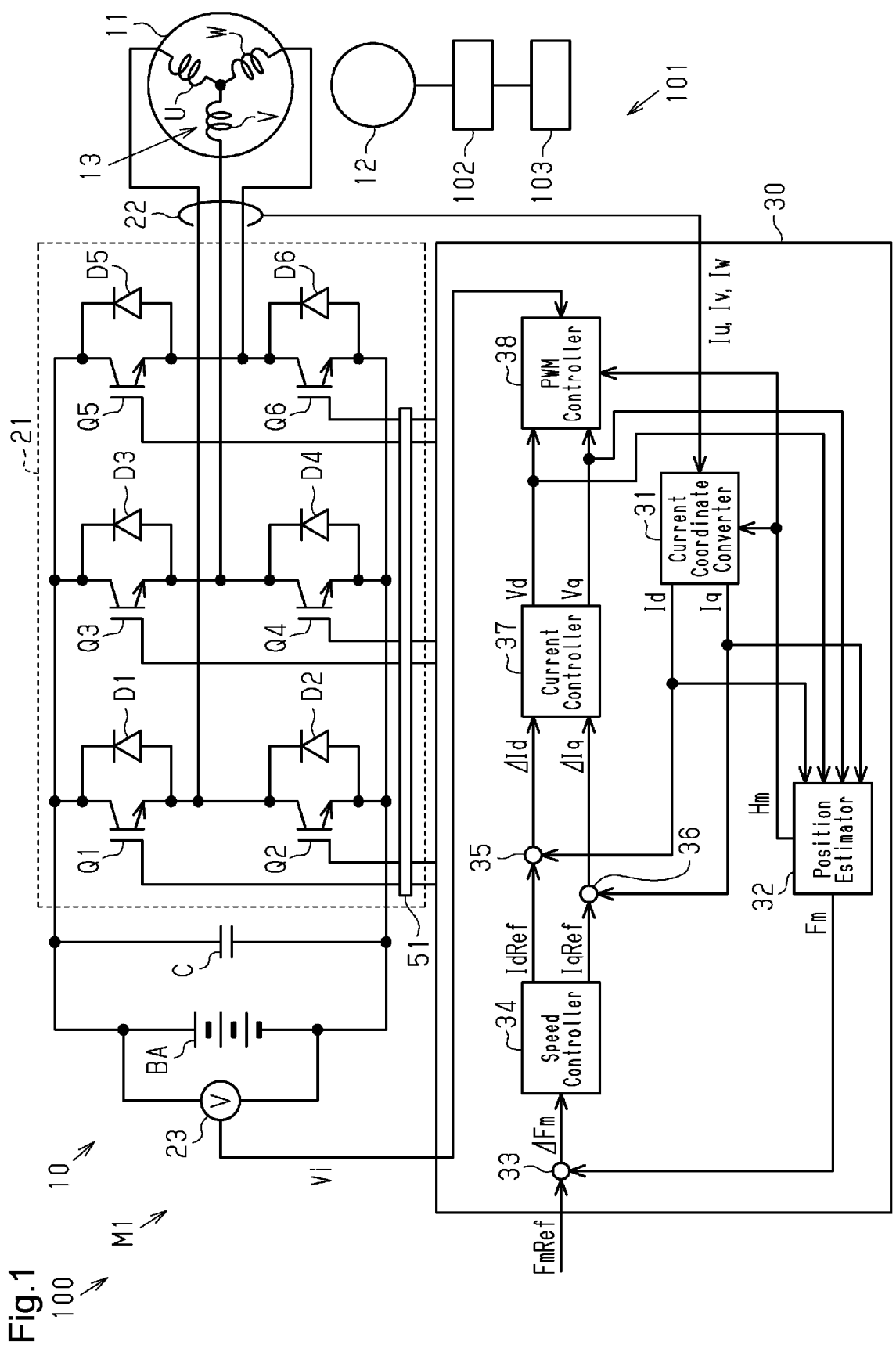
FIG. 1 is a schematic diagram of an electric motor.

As shown in FIG. 1, a vehicle air conditioner 100 includes a motor-driven compressor 101 and a refrigerant circuit 103. The motor-driven compressor 101 includes a compression unit 102 and an electric motor M1. The motor-driven compressor 101 compresses refrigerant. The refrigerant circuit 103 includes, for example, a heat exchanger and an expansion valve. The motor-driven compressor 101 compresses the refrigerant, and the refrigerant circuit 103 performs heat exchange of the refrigerant and expands the refrigerant. This allows the vehicle air conditioner 100 to cool or warm the passenger compartment. The motor-driven compressor 101 discharges oil together with the compressed refrigerant.

The compression unit 102 compresses refrigerant. The refrigerant compressed by the compression unit 102 is discharged to the refrigerant circuit 103. The compression unit 102 may be of any type, such as a scroll type, a piston type, or a vane type.

Electric Motor

The electric motor M1 includes a motor unit 11. The motor unit 11 includes a rotor 12 and a stator 13 around which three-phase coils U, V, W are wound. The motor unit 11 is a three-phase motor including three coils U, V, W. The motor unit 11 drives the compression unit 102.

The electric motor M1 includes a motor driving device 10. The motor driving device 10 includes a battery BA, a smoothing capacitor C, an inverter unit 21, a phase current detector 22, an input voltage detector 23, and a controller 30.

The inverter unit 21 includes six switching elements Q1 to Q6, diodes D1 to D6, and a driver 51. The switching elements Q1 to Q6 are, for example, insulated-gate bipolar transistors (IGBTs). When the switching elements Q1 to Q6 are integrated with the diodes D1 to D6, the switching elements Q1 to Q6 are metal-oxide-semiconductor field-effect transistors (MOSFETs). The switching element Q1 and the switching element Q2 are connected in series. The switching element Q3 and the switching element Q4 are connected in series. The switching element Q5 and the switching element Q6 are connected in series. The diodes Q1 to Q6 are connected in parallel to the switching elements D1 to D6, respectively. The switching elements Q1 to Q6 are connected to the battery BA via the smoothing capacitor C.

A connection line that connects the switching element Q1 to the switching element Q2 is branched and connected to the coil U. A connection line that connects the switching element Q3 to the switching element Q4 is branched and connected to the coil V. A connection line that connects the switching element Q5 to the switching element Q6 is branched and connected to the coil W.

The driver 51 drives the switching elements Q1 to Q6. The driving of the switching elements Q1 to Q6 drives the motor unit 11. Driving the switching elements Q1 to Q6 refers to switching operations of the switching elements Q1 to Q6, that is, switching between on and off states of the switching elements Q1 to Q6.

The battery BA is a power storage device capable of being charged and discharged. The rated voltage of the battery BA is, for example, 800V.

The phase current detector 22 detects the phase current flowing through the motor unit 11. The phase current detector 22 detects phase currents of at least two phases. In the present embodiment, the phase current detector 22 detects a u-phase current Iu, a v-phase current Iv, and a w-phase current Iw. The phase currents of two of the three phases may be detected to calculate the phase current of the other one of the three phases from the two-phase currents. The u-phase current Iu, the v-phase current Iv, and the w-phase current Iw flow through their respective phases of the motor unit 11.

The input voltage detector 23 detects an input voltage Vi that is received by the inverter unit 21 from the battery BA.

Controller

The controller 30 includes a processor and a memory. The processor is, for example, a central processing unit (CPU), a graphics processing unit (GPU), or a digital signal processor (DSP). The memory includes a random access memory (RAM) and a read-only memory (ROM). The memory stores program codes or instructions configured to cause the processor to execute processes. The memory, or a computer-readable medium, includes any type of media that is accessible by general-purpose computers or dedicated computers. The controller 30 may include a hardware circuit such as an application-specific integrated circuit (ASIC) and a field-programmable gate array (FPGA). The controller 30, which is processing circuitry, may include one or more processors that run according to a computer program, one or more hardware circuits (e.g., ASIC or FPGA), or a combination thereof.

The controller 30 calculates command values. The controller 30 uses the command values to control the switching elements Q1 to Q6. The controller 30 controls the inverter unit 21 through sensorless control. The sensorless control is a mode of controlling the inverter unit 21 without using a hardware position sensor that detects a position Hm of the rotor 12 of the motor unit 11. The inverter unit 21 is controlled to drive the motor unit 11. The controller 30 controls the inverter unit 21 while switching between position estimation using an induced voltage mode and position estimation using a harmonic superimposition mode. The induced voltage mode estimates the position Hm of the rotor 12 based on the induced voltage generated in the three-phase coils U, V, W. The harmonic superimposition mode is a mode of estimating the position Hm of the rotor 12 by superimposing a harmonic on a command values.

Position Estimation Using Induced Voltage Mode

The function of the controller 30 in the case of performing position estimation using the induced voltage mode will now be described. The controller 30 includes a current coordinate converter 31, a position estimator 32, subtractors 33, 35, 36, a speed controller 34, a current controller 37, and a PWM controller 38.

The current coordinate converter 31 converts the phase currents Iu, Iv, Iw to a d-axis current Id and a q-axis current Iq, based on the position Hm of the rotor 12 estimated by the position estimator 32. For example, the current coordinate converter 31 converts the phase currents Iu, Iv, Iw of a three-phase (U, V, W) fixed coordinate system into currents Iα, Iβ of a two-phase (α, β) fixed coordinate system. The current coordinate converter 31 uses the position Hm to convert the currents Iα, Iβ into the d-axis current Id and the q-axis current Iq in a two-phase (d, q) rotation coordinate system. The d-axis and the q-axis are coordinate axes in a dq coordinate system. The dq coordinate system is a coordinate system that rotates together with the rotor 12 of the motor unit 11. The current coordinate converter 31 may directly convert the phase currents Iu, Iv, Iw into the d-axis current Id and the q-axis current Iq, without converting them into the currents Iα, Iβ.

The position estimator 32 estimates the position Hm of the rotor 12 of the motor unit 11 based on the d-axis current Id and the q-axis current Iq output from the current coordinate converter 31 and based on a d-axis voltage command value Vd and a q-axis voltage command value Vq output from the current controller 37. For example, the position estimator 32 uses the d-axis current Id and q-axis current Iq, the d-axis voltage command value Vd and q-axis voltage command value Vq, which are obtained from the current controller 37, and a constant defined by the motor unit 11 to calculate induced voltages produced in the coils U, V, W. Then, the position estimator 32 estimates the position Hm based on the induced voltage. Further, the position estimator 32 estimates a rotation speed Fm of the rotor 12 based on the induced voltage.

The subtractor 33 calculates a difference ΔFm between the rotation speed Fm, which has been estimated by the position estimator 32, and a rotation speed command value FmRef. The controller 30 receives the rotation speed command value FmRef from an external device. The controller 30 receives the rotation speed command value FmRef from, for example, an upper-rank control device for a vehicle.

The speed controller 34 uses the difference ΔFm to calculate the d-axis current command value IdRef and the q-axis current command value IqRef. For example, the speed controller 34 uses feedback control to calculate the d-axis current command value IdRef and the q-axis current command value IqRef such that the difference ΔFm converges to zero. The feedback control is, for example, a proportional-integral control.

The subtractor 35 calculates a difference ΔId between the d-axis current command value IdRef and the d-axis current Id. The subtractor 36 calculates a difference ΔIq between the q-axis current command value IqRef and the q-axis current Iq.

The current controller 37 uses the difference ΔId to calculate the d-axis voltage command value Vd. The current controller 37 uses the difference ΔIq to calculate the q-axis voltage command value Vq. The current controller 37 calculates the d-axis voltage command value Vd and the q-axis voltage command value Vq using, for example, feedback control such that the difference ΔId and the difference ΔIq converge to zero. The feedback control is, for example, a proportional-integral control.

The PWM controller 38 converts the d-axis voltage command value Vd and the q-axis voltage command value Vq into a u-phase voltage command value Vu, a v-phase voltage command value Vv, and a w-phase voltage command value Vw based on the position Hm of the rotor 12, which has been estimated by the position estimator 32, and the input voltage Vi. For example, the PWM controller 38 converts the d-axis voltage command value Vd and the q-axis voltage command value Vq from the dq coordinate system into voltage command values Vα, Vβ in a αβ coordinate system. The PWM controller 38 converts the two-phase voltage command values Vα, Vβ into three-phase voltage command values Vu, Vv, Vw. The PWM controller 38 may directly convert the d-axis voltage command value Vd and the q-axis voltage command value Vq into the voltage command values Vu, Vv, Vw, without converting them into the voltage command values Vα, Vβ.

The voltage command values Vu, Vv, Vw are used to control the inverter unit 21. Specifically, the PWM controller 38 generates a PWM signal based on the voltage command values Vu, Vv, Vw and a carrier frequency, and controls the switching elements Q1 to Q6 using the PWM signal.

Position Estimation Using Harmonic Superimposition Mode

The function of the controller 30 in the case of performing position estimation using the harmonic superimposition mode will now be described.

Figure 2:
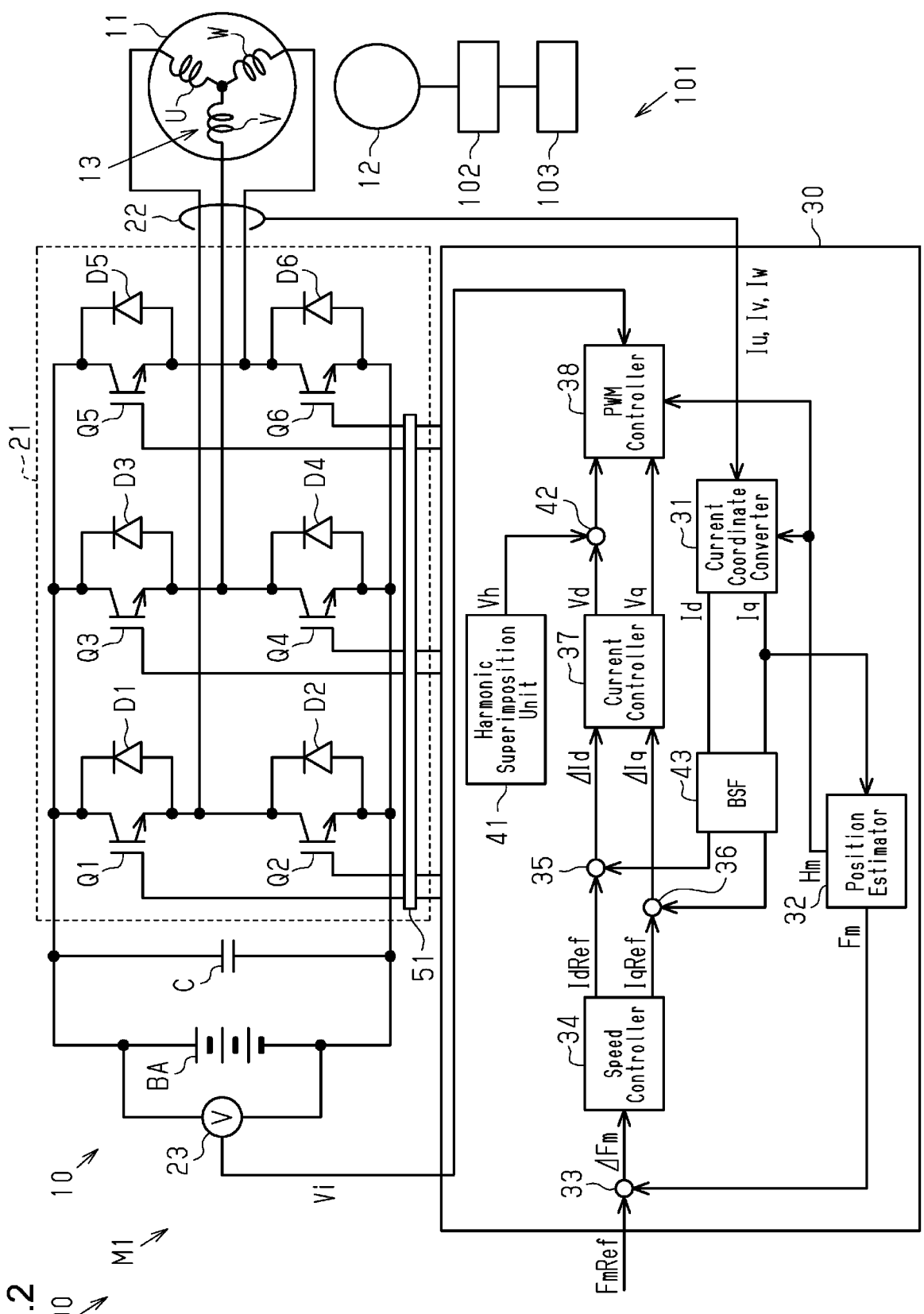
FIG. 2 is a schematic diagram of the electric motor.

As shown in FIG. 2, the controller 30 includes the current coordinate converter 31, the position estimator 32, the subtractors 33, 35, 36, the speed controller 34, the current controller 37, the PWM controller 38, a harmonic superimposition unit 41, an adder 42, and a band-stop filter 43. The current coordinate converter 31, the subtractors 33, 35, 36, the speed controller 34, the current controller 37, and the PWM controller 38 have the same functions as those in the case of the induced voltage mode, and thus will not be described. The harmonic superimposition unit 41 generates a harmonic Vh. The harmonic Vh is defined by Va*cos 2πft. Here, Va is the amplitude of the harmonic Vh, and f is the frequency of the harmonic Vh. The frequency f is, for example, a frequency that does not depend on the rotation of the motor unit 11.

The adder 42 adds the harmonic Vh, which has been generated by the harmonic superimposition unit 41, to the d-axis voltage command value Vd. This causes the harmonic Vh to be superimposed on the d-axis voltage command value Vd.

In the present embodiment, the controller 30 superimposes the harmonic Vh on only the d-axis voltage command value Vd in the harmonic superimposition mode. The controller 30 may cause the position estimator 32 to estimate the position of the rotor 12 by superimposing the harmonic Vh on the d-axis voltage command value Vd and the q-axis voltage command value Vq. Instead, the controller 30 may cause the position estimator 32 to estimate the position of the rotor 12 by superimposing the harmonic Vh on the d-axis current command value IdRef and the q-axis current command value IqRef. Alternatively, the controller 30 may cause the position estimator 32 to estimate the position of the rotor 12 by superimposing the harmonic Vh on only the three-phase voltage command values Vu, Vv, Vw.

The band-stop filter 43 removes frequency components in a specific band from the d-axis current Id and the q-axis current Iq. When the harmonic superimposition unit 41 superimposes the harmonic Vh on the d-axis voltage command value Vd, a frequency component of the harmonic Vh is included in the d-axis current Id and the q-axis current Iq. The band-stop filter 43 removes this frequency component.

The position estimator 32 estimates the position Hm of the rotor 12 and the rotation speed Fm of the rotor 12 from the q-axis current Iq calculated by the current coordinate converter 31. When the harmonic Vh is superimposed on the d-axis voltage command value Vd, the q-axis current Iq includes a current harmonic that is based on the harmonic Vh. The position estimator 32 estimates the position Hm of the rotor 12 and the rotation speed Fm of the rotor 12 from the current harmonic included in the q-axis current Iq and from an expression model of the motor unit 11. For example, the position estimator 32 calculates an axis error Mc from the current harmonic. The axis error Mc is the difference between an actual position Hm of the rotor 12 and the position Hm of the rotor 12 that is recognized by the controller 30. The position estimator 32 estimates the position Hm of the rotor 12 and the rotation speed Fm of the rotor 12 such that the axis error Mc becomes zero.

Control Performed by Controller and Operation of Present Embodiment

The controller 30 switches between the position estimation using the induced voltage mode and the position estimation using the harmonic superimposition mode by performing the following control. The following control is repeatedly executed in a predetermined control cycle during driving of the motor unit 11.

Figure 3:
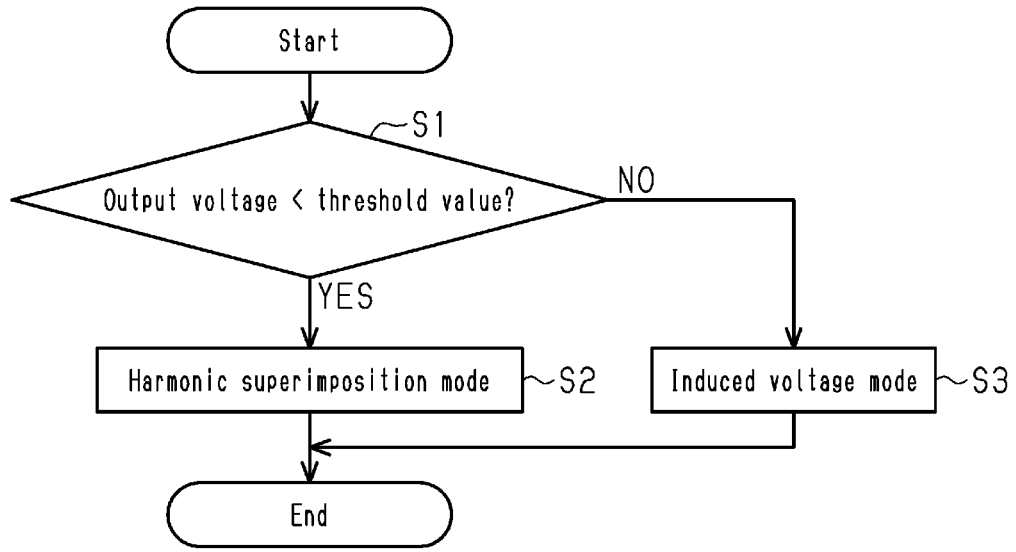
FIG. 3 is a flowchart showing control executed by the processing circuitry.

As shown in FIG. 3, in step S1, the controller 30 determines whether an output voltage Vo of the inverter unit 21 is less than a threshold value. The threshold value is a predetermined value. The output voltage Vo of the inverter unit 21 is a voltage that is received by the motor unit 11. In the present embodiment, the output voltage Vo of the inverter unit 21 is a combined value of the d-axis voltage command value Vd and the q-axis voltage command value Vq. The output voltage Vo of the inverter unit 21 is calculated from the following equation (1). The controller 30, which detects the output voltage Vo of the inverter unit 21, serves as an output voltage detector.

$$V_o = \sqrt{V_d^2 + V_q^2} \quad (1)$$

As indicated in the following equation (2), the output voltage Vo of the inverter unit 21 is correlated with the induced voltage generated in the motor unit 11.

$$\begin{bmatrix} Vd \\ Vq \end{bmatrix} = \begin{bmatrix} R + pLd & -\omega Lq \\ \omega Ld & R + pLq \end{bmatrix} \begin{bmatrix} Id \\ Iq \end{bmatrix} + \begin{bmatrix} 0 \\ e \end{bmatrix} \quad (2)$$

Here, R represents a phase resistance, Ld represents a d-axis inductance, Lq represents a q-axis inductance, ω represents an angular velocity, e represents an induced voltage, and p represents a differential term. R, Ld, and Lq are smaller than e. Thus, the output voltage Vo is proportional to the induced voltage. That is, when the output voltage Vo is set to the threshold value, the induced voltage is set to the threshold value.

When the position of the rotor 12 is estimated using the induced voltage mode, the position estimation accuracy decreases as the output voltage Vo decreases. The threshold value is set based on the output voltage Vo that is obtained when the reduction in the position estimation accuracy exceeds an allowable range. That is, when the reduction in the position estimation accuracy of the induced voltage mode exceeds the allowable range, the threshold value is set such that the position estimation using the harmonic superimposition mode is performed.

When the determination result of step S1 is affirmative, the controller 30 performs the process of step S2. When the determination result of step S1 is negative, the controller 30 performs the process of step S3.

In step S2, the controller 30 estimates the position Hm of the rotor 12 using the harmonic superimposition mode. The controller 30 uses the harmonic superimposition mode to estimate the rotation speed Fm of the rotor 12. When the output voltage Vo is less than the threshold value, the controller 30 causes the position estimator 32 to estimate the position Hm of the rotor 12 using the harmonic superimposition mode.

In step S3, the controller 30 estimates the position Hm of the rotor 12 using the induced voltage mode. The controller 30 uses the induced voltage mode to estimate the rotation speed Fm of the rotor 12. When the output voltage Vo is greater than or equal to the threshold value, the controller 30 causes the position estimator 32 to estimate the position Hm of the rotor 12 through the induced voltage mode.

Figure 4:
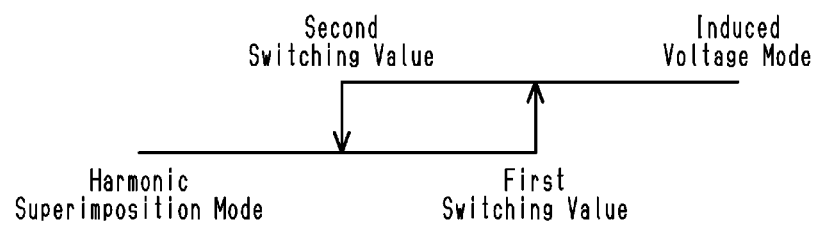
FIG. 4 is a diagram showing threshold values used in the control of FIG. 3.

As shown in FIG. 4, a hysteresis is set for the threshold value. The threshold value includes a first switching value and a second switching value. The second switching value is less than the first switching value. The first switching value is a first threshold value. The second switching value is a second threshold value. The threshold value for the controller 30 to estimate the position Hm of the rotor 12 using the harmonic superimposition mode is the first switching value. The threshold value for the controller 30 to estimate the position Hm of the rotor 12 using the induced voltage mode is the second switching value. The controller 30 uses the first switching value to switch from the harmonic superimposition mode to the induced voltage mode. The controller 30 uses the second switching value to switch from the induced voltage mode to the harmonic superimposition mode.

ADVANTAGES OF PRESENT EMBODIMENT (1) When the output voltage Vo of the inverter unit 21 is less than the threshold value, the controller 30 causes the position estimator 32 to estimate the position Hm of the rotor 12 using the harmonic superimposition mode. The output voltage Vo of the inverter unit 21 is correlated with the induced voltage generated in the motor unit 11. When the output voltage Vo of the inverter unit 21 is set to the threshold value, there is no need to set a threshold value by taking into account variations in the induced voltage that would result from the temperature of the motor unit 11. This limits an increase in the speed range in which the position Hm of the rotor 12 is estimated using the harmonic superimposition mode.

(2) When the output voltage Vo of the inverter unit 21 is greater than or equal to the threshold value, the controller 30 causes the position estimator 32 to estimate the position Hm of the rotor 12 using the induced voltage mode. In the harmonic superimposition mode, the superimposition of the harmonic Vh may deteriorate the quietness of the motor unit 11. In addition, the generation of a current harmonic may lower the efficiency of the motor unit 11. When the output voltage Vo is greater than or equal to the threshold value, the position Hm of the rotor 12 is estimated using the induced voltage mode. This limits the deterioration of the quietness of the motor unit 11. This also limits a decrease in the efficiency of the motor unit 11.

(3) A hysteresis is set for the threshold value. If the threshold value were to set to a single predetermined value, when the output voltage Vo fluctuates across the threshold value, the harmonic superimposition mode and the induced voltage mode may be often switched. If the harmonic superimposition mode and the induced voltage mode are often switched, the stability of the control may be adversely affected during the switching. By setting a hysteresis for the threshold value, the harmonic superimposition mode and the induced voltage mode will be switched less frequently.

(4) The electric motor M1 is used in the motor-driven compressor 101. Depending on the capacity of the motor-driven compressor 101, the motor-driven compressor 101 may be driven while the motor unit 11 switches between on and off states when the load on the motor unit 11 is relatively low. In this case, there may be a risk that the oil discharged with the refrigerant does not circulate, leading to an oil shortage inside the motor-driven compressor 101. To prevent the motor unit 11 from switching between on and off states when the load is relatively low, the minimum rotation speed of the motor-driven compressor 101 needs to be lowered. The reduction in the minimum rotation speed of the motor-driven compressor 101 widens the speed range in which the position Hm of the rotor 12 needs to be estimated using the harmonic superimposition mode. In the electric motor M1 of the present embodiment, the threshold value set for the output voltage Vo is prevented from becoming excessively high. The electric motor M1 is used in the motor-driven compressor 101. Thus, even if the minimum rotation speed of the motor-driven compressor 101 is reduced, an excessive increase is prevented in the speed range in which the position Hm of the rotor 12 needs to be estimated using the harmonic superimposition mode.

Modifications

The present embodiment may be modified as follows. The present embodiment and the following modifications can be combined as long as the combined modifications remain technically consistent with each other.

A hysteresis does not need to be set for the threshold value.

The output voltage Vo that is set to the threshold value may be a q-axis voltage command value Vq that includes an induced voltage term.

The output voltage Vo that is set to the threshold value may be an actual voltage output from the inverter unit 21.

The electric motor M1 may be mounted on any device. The electric motor M1 may be used as, for example, a drive source for an air pump or a hydrogen pump that is mounted on a fuel cell electric vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An electric motor, comprising:
a motor unit including a rotor, a stator, and three-phase coils wound around the stator;
an inverter unit including a driver and a switching element driven by the driver, the inverter unit being configured to drive the motor unit when the switching element is driven;
an output voltage detector configured to detect an output voltage of the inverter unit; and
processing circuitry configured to calculate command values and control the switching element, the command values being used to control the switching element, wherein
the processing circuitry is configured to estimate the position of the rotor in a mode selected from an induced voltage mode and a harmonic superimposition mode,
the induced voltage mode is a mode of estimating the position of the rotor based on an induced voltage that is generated in the three-phase coils,
the harmonic superimposition mode is a mode of estimating the position of the rotor by superimposing a harmonic on each of the command values, and
the processing circuitry is configured to:
estimate the position of the rotor using the induced voltage mode when the output voltage is greater than or equal to a predetermined threshold value; and
estimate the position of the rotor using the harmonic superimposition mode when the output voltage is less than the threshold value.

2. The electric motor according to claim 1, wherein the processing circuitry is configured to:
estimate a rotation speed of the rotor;
convert a phase current into a d-axis current and a q-axis current based on the position of the rotor;
calculate a d-axis current command value and a q-axis current command value based on a difference between the rotation speed and a rotation speed command value, the rotation speed command value being received from an external device;
calculate a d-axis voltage command value based on a difference between the d-axis current and the d-axis current command value;
calculate a q-axis voltage command value based on a difference between the q-axis current and the q-axis current command value;
calculate three-phase voltage command values of three phases based on the d-axis voltage command value and the q-axis voltage command value; and
in the harmonic superimposition mode, estimate the position of the rotor by superimposing a harmonic on only the d-axis voltage command value, on the d-axis voltage command value and the q-axis voltage command value, on the d-axis current command value and the q-axis current command value, or on only the three-phase voltage command values.

3. The electric motor according to claim 1, wherein
the threshold value includes a first threshold value and a second threshold value that is less than the first threshold value, and
the processing circuitry is configured to use the first threshold value for switching from the harmonic superimposition mode to the induced voltage mode and use the second threshold value for switching from the induced voltage mode to the harmonic superimposition mode.

* * * * *